(12) United States Patent
Negrete et al.

(10) Patent No.: US 12,322,777 B2
(45) Date of Patent: Jun. 3, 2025

(54) BATTERY ARRAY DESIGNS WITH INTEGRATED ROLL BONDED COLD PLATES

(71) Applicant: FORD GLOBAL TECHNOLOGIES, LLC, Dearborn, MI (US)

(72) Inventors: Justin Negrete, Northville, MI (US); Samir Subba, Dearborn, MI (US); Liam E. West, Ferndale, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 690 days.

(21) Appl. No.: 17/549,047

(22) Filed: Dec. 13, 2021

(65) Prior Publication Data

US 2023/0187727 A1   Jun. 15, 2023

(51) Int. Cl.
| | | |
|---|---|---|
| *H01M 10/00* | (2006.01) | |
| *H01M 10/0525* | (2010.01) | |
| *H01M 10/613* | (2014.01) | |
| *H01M 10/625* | (2014.01) | |
| *H01M 10/6554* | (2014.01) | |
| *H01M 50/209* | (2021.01) | |
| *H01M 50/249* | (2021.01) | |

(52) U.S. Cl.
CPC ... *H01M 10/6554* (2015.04); *H01M 10/0525* (2013.01); *H01M 10/613* (2015.04); *H01M 10/625* (2015.04); *H01M 50/209* (2021.01); *H01M 50/249* (2021.01); *H01M 2220/20* (2013.01)

(58) Field of Classification Search
CPC ......... H01M 10/6554; H01M 10/0525; H01M 10/613; H01M 10/625; H01M 50/209; H01M 50/249
See application file for complete search history.

(56) References Cited

U.S. PATENT DOCUMENTS

| | | | |
|---|---|---|---|
| 2018/0062226 A1* | 3/2018 | Raiser | H01M 10/613 |
| 2019/0283627 A1 | 9/2019 | Gehringhoff et al. | |
| 2021/0376416 A1* | 12/2021 | Handing | H01M 50/204 |

FOREIGN PATENT DOCUMENTS

| | | | | |
|---|---|---|---|---|
| CN | 113258033 A | * | 8/2021 | ........ H01M 10/0525 |
| DE | 102017215083 A1 | | 2/2019 | |
| EP | 3026753 A1 | | 6/2016 | |
| WO | 2021/009256 A1 | | 1/2021 | |

OTHER PUBLICATIONS

Igushi et al., Non-aqueous Electrolyte Secondary Battery And Secondary Battery Pack, Aug. 2021, See the Abstract. (Year: 2021).*

* cited by examiner

*Primary Examiner* — Anca Eoff
*Assistant Examiner* — Monique M Wills
(74) *Attorney, Agent, or Firm* — David B. Kelley; Carlson, Gaskey & Olds, P.C.

(57) ABSTRACT

Battery arrays may be housed within electrified vehicle battery packs. An exemplary battery array may include an array support structure that includes a roll bonded cold plate. The roll bonded cold plate may be integrated into the battery array, as opposed to an outer enclosure assembly of the traction battery pack, and is thus arranged to directly thermally manage one or more battery cells of the battery array. The roll bonded cold plate may be configured to establish a single side or multiple sides of the array support structure.

14 Claims, 5 Drawing Sheets

BATTERY ARRAY DESIGNS WITH INTEGRATED ROLL BONDED COLD PLATES

TECHNICAL FIELD

This disclosure relates to traction battery packs, and more particularly to battery arrays that include roll bonded cold plates that are integrated components of the battery array.

BACKGROUND

Electrified vehicles can reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack may power the electric machines and other electrical loads of the electrified vehicle. An outer enclosure assembly of the battery pack houses a plurality of battery internal components including, but not limited to, battery arrays and other battery electronic components.

The battery internal components may generate heat during certain conditions. This heat may be thermally managed using one or more cold plates arranged between the battery internal components and the outer enclosure assembly. The cold plates are typically separate structures from the battery arrays.

SUMMARY

A battery array for a traction battery pack according to an exemplary aspect of the present disclosure includes, among other things, a grouping of battery cells, and a support structure arranged around an outer perimeter of the grouping of battery cells. The support structure includes a roll bonded cold plate positioned to thermally manage the grouping of battery cells.

In a further non-limiting embodiment of the foregoing battery array, the roll bonded cold plate includes a first plate member and a second plate member that is joined to the first plate member along a roll bond joint.

In a further non-limiting embodiment of either of the foregoing battery arrays, a thermal interface material is disposed between the grouping of battery cells and the first plate member.

In a further non-limiting embodiment of any of the foregoing battery arrays, the first plate member includes a first thickness and the second plate member includes a second thickness that is less than the first thickness.

In a further non-limiting embodiment of any of the foregoing battery arrays, the first plate member includes a first material alloy and the second plate member includes a second material alloy that is different from the first material alloy.

In a further non-limiting embodiment of any of the foregoing battery arrays, the roll bonded cold plate establishes a bottom plate of the support structure.

In a further non-limiting embodiment of any of the foregoing battery arrays, a side plate or an end plate of the support structure is secured to the roll bonded cold plate by a weld.

In a further non-limiting embodiment of any of the foregoing battery arrays, the roll bonded cold plate establishes a top plate of the support structure.

In a further non-limiting embodiment of any of the foregoing battery arrays, the roll bonded cold plate establishes a bottom plate, a first side wall, and a second side wall of the support structure.

In a further non-limiting embodiment of any of the foregoing battery arrays, the bottom plate includes both roll bonded sections and unbonded sections, and the first side wall and the second side wall each include only roll bonded sections.

In a further non-limiting embodiment of any of the foregoing battery arrays, the bottom plate includes both roll bonded sections and unbonded sections, and the first side wall and the second side wall each include only unbonded sections.

In a further non-limiting embodiment of any of the foregoing battery arrays, the unbonded sections of the first side wall and the second side wall are established by a first plate member of the roll bonded cold plate.

In a further non-limiting embodiment of any of the foregoing battery arrays, the roll bonded cold plate establishes a bottom plate, a first end wall, and a second end wall of the support structure.

In a further non-limiting embodiment of any of the foregoing battery arrays, the roll bonded cold plate includes a plurality of internal cooling passages.

In a further non-limiting embodiment of any of the foregoing battery arrays, the support structure is a separate and distinct structure from an outer enclosure assembly of the traction battery pack.

A battery array for a traction battery pack according to another exemplary aspect of the present disclosure includes, among other things, a grouping of battery cells, and a support structure arranged about the grouping of battery cells and including a pair of end plates, a pair of side plates, a top plate, and a bottom plate. The bottom plate is established by a roll bonded cold plate that is configured to thermally manage the grouping of battery cells. The roll bonded cold plate includes a first plate member and a second plate member that is joined to the first plate member along a roll bond joint.

In a further non-limiting embodiment of the foregoing battery array, the roll bonded cold plate includes both roll bonded sections and unbonded sections.

In a further non-limiting embodiment of either of the foregoing battery arrays, a plurality of internal cooling passages are formed in the unbonded sections.

In a further non-limiting embodiment of any of the foregoing battery arrays, the pair of sides plates are established by one or both of the first plate member and the second plate member of the roll bonded cold plate.

In a further non-limiting embodiment of any of the foregoing battery arrays, each side plate of the pair of side plates is secured to the roll bonded cold plate by a weld.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the

DETAILED DESCRIPTION

This disclosure details battery array designs for electrified vehicle battery packs. An exemplary battery array may include an array support structure that includes a roll bonded cold plate. The roll bonded cold plate may be integrated into the battery array, as opposed to an outer enclosure assembly of the traction battery pack, and is thus arranged to directly thermally manage one or more battery cells of the battery array. The roll bonded cold plate may establish a single side or multiple sides of the array support structure. These and other features are discussed in greater detail in the following paragraphs of this detailed description.

Figure 1:
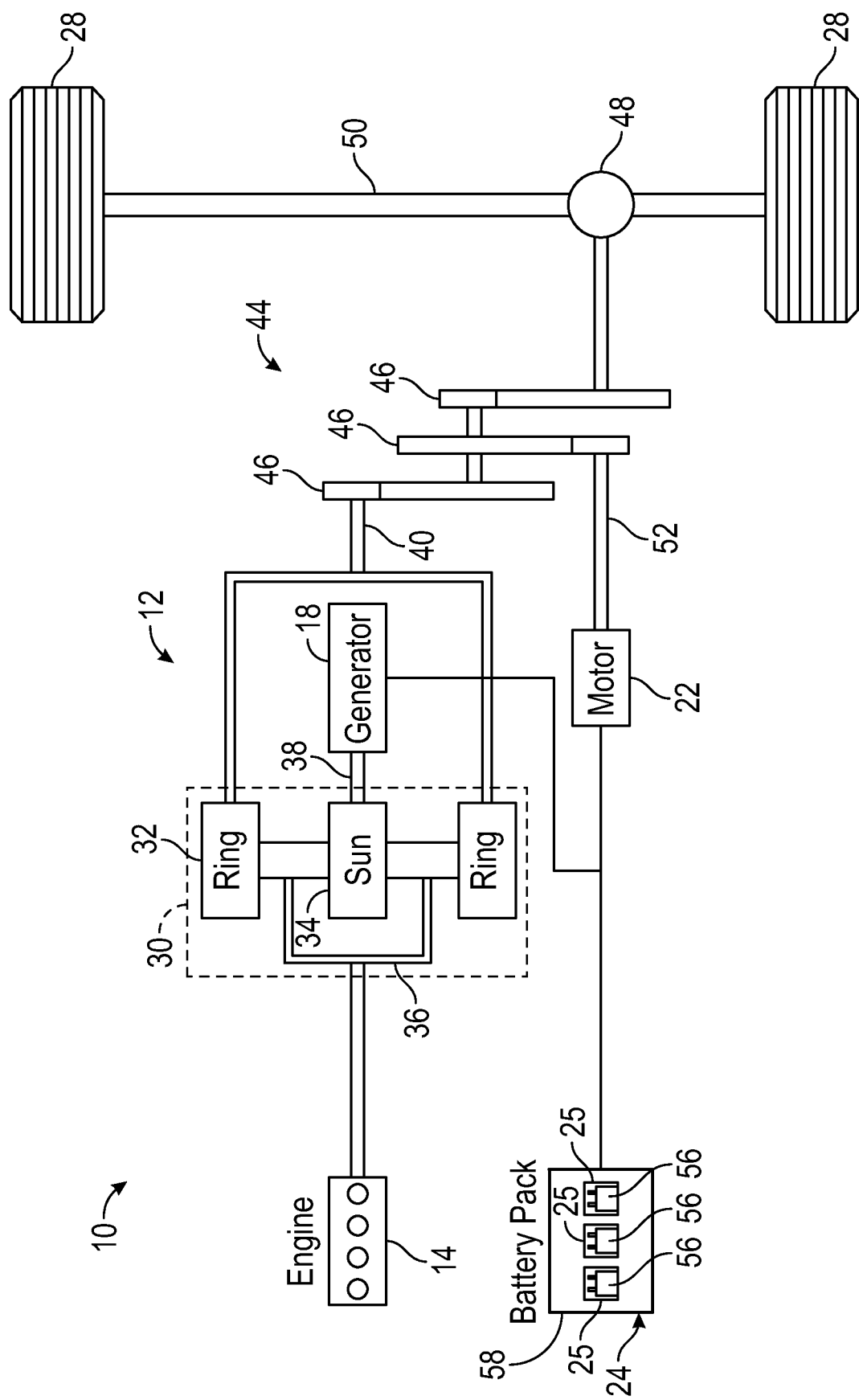
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a traction battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including but not limited to full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In an embodiment, the power transfer unit 30 is a planetary gear set that includes a ring gear 32, a sun gear 34, and a carrier assembly 36.

The generator 18 may be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In an embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the traction battery pack 24.

The traction battery pack 24 is an exemplary electrified vehicle traction battery. The traction battery pack 24 may be a high voltage traction battery pack that includes one or more battery arrays 25 (i.e., battery assemblies or groupings of battery cells 56) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

The total number of battery arrays 25 and battery cells 56 provided within the traction battery pack 24 is not intended to limit this disclosure. In an embodiment, the battery cells 56 of each battery array 25 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery arrays 25 and any other battery internal components (e.g., battery electronics, wiring, connectors, etc.) of the traction battery pack 24 may be housed inside an outer enclosure assembly 58. In an embodiment, the outer enclosure assembly 58 is a sealed outer enclosure that establishes the outermost surfaces of the traction battery pack 24. The outer enclosure assembly 58 may include any size, shape, and configuration within the scope of this disclosure. The battery arrays 25 are completely separate structures from the outer enclosure assembly 58 and therefore are not considered to established any portion of the outermost surfaces of the traction battery pack 24.

Heat may be generated and released by the battery cells 56 during charging operations, discharging operations, extreme ambient conditions, and/or various other conditions. It may be desirable to remove the heat from the battery arrays 25 to improve their capacity, life, and performance Cold plates, which are typically separate structures from the battery arrays 25, are commonly used within traction battery packs for this purpose. However, cold plates can be expensive to manufacture and are sometimes difficult to package inside traction battery packs due to various assembly and manufacturing complexities. This disclosure is therefore directed to improved battery array configurations that incorporate integrated roll bonded cold plates that reduce expenses associated with prior cold plate manufacturing methods.

Figure 2:
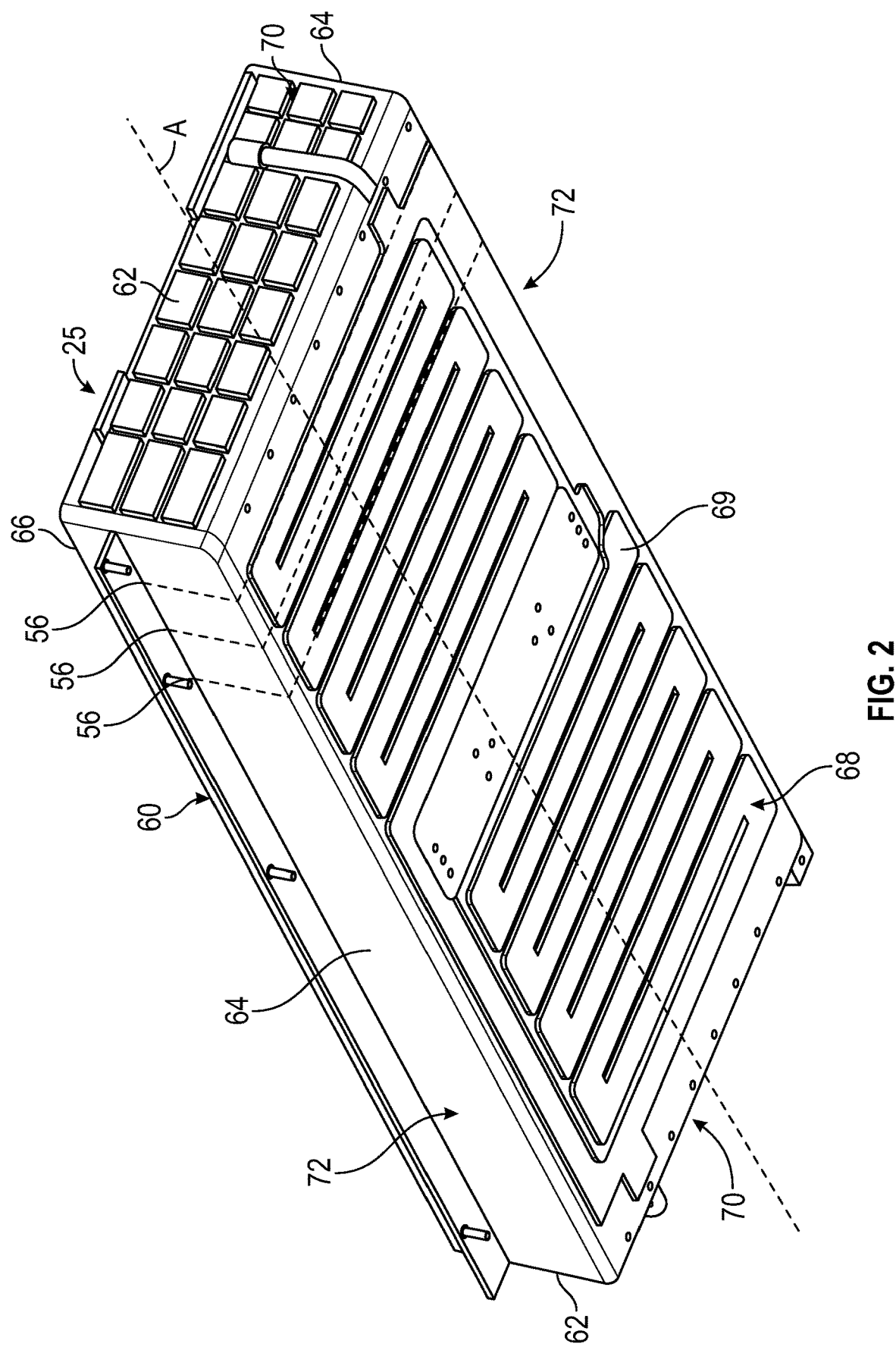
FIG. 2 is a perspective view of a battery array of a traction battery pack.
Figure 3:
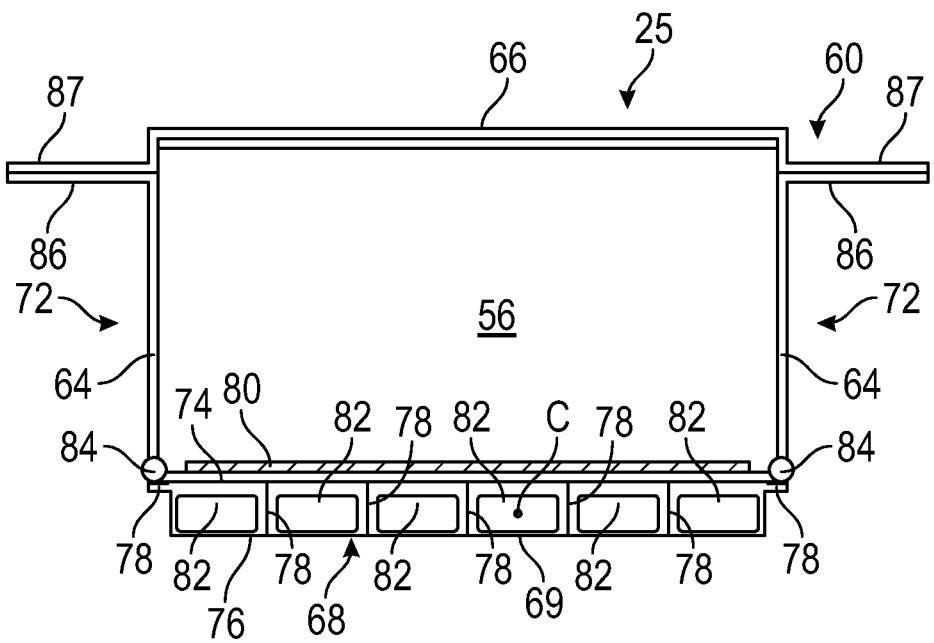
FIG. 3 is a cross-sectional view through section 3-3 of FIG. 2.

FIGS. 2 and 3 illustrate an exemplary battery array 25 that can be employed within a traction battery pack of an electrified vehicle. For example, the battery array 25 could be employed for use within the traction battery pack 24 of the electrified vehicle 12 of FIG. 1 or any other electrified vehicle.

The battery array 25 may include a plurality of battery cells 56 that store energy for powering various electrical loads of the electrified vehicle 12. The battery array 25 could include any number of battery cells 56 within the scope of this disclosure. Accordingly, this disclosure is not limited to the exact configuration shown in FIG. 2.

The battery cells 56 may be stacked side-by-side along a stack axis to construct a grouping of battery cells 56, sometimes referred to as a "cell stack." Although not specifically shown or emphasized here, the battery cells 56 could be held within a plurality of repeating and interconnecting array frames in order to construct the cell stack.

The grouping of battery cells 56 (which may or may not include array frames) may be substantially surrounded by a support structure 60. The support structure 60 may be disposed about an outer perimeter of the cell stack for axially constraining the battery cells 56 in the stacked configuration. Unlike the outer enclosure assembly 58, the support structure 60 may directly contact the battery cells (or the array frames that hold the battery cells 56).

Figure 4:
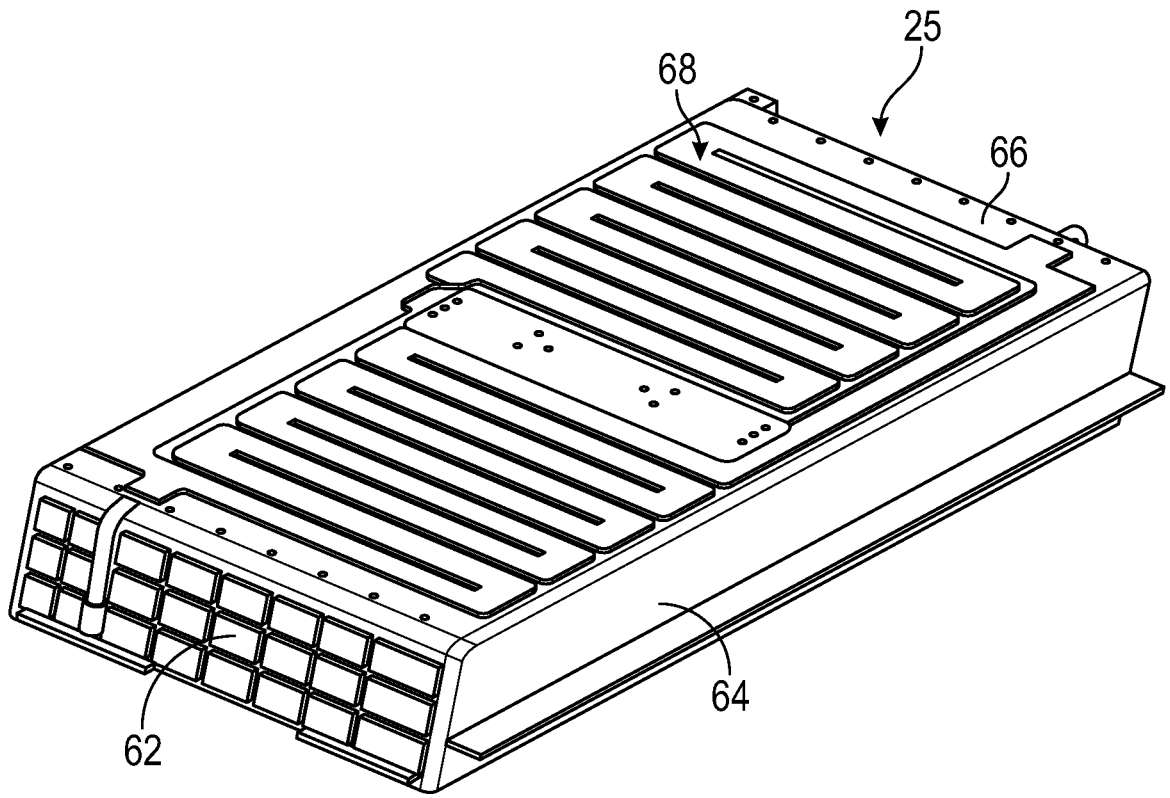
FIG. 4 is a perspective view of another exemplary battery array.

In an embodiment, the support structure 60 of the battery array 25 includes pairs of end plates 62, a pair of side plates 64, a top plate 66, and a roll bonded cold plate 68. In the illustrated embodiment, the roll bonded cold plate 68 is arranged to function as a bottom cover or bottom plate 69 of the support structure 60, and therefore in a normal orientation of the battery array 25 as positioned within the outer enclosure assembly 58 of the assembled traction battery pack 24, the roll bonded cold plate 68 may establish a base of the battery array 25. However, other configurations are also contemplated within the scope of this disclosure. For example, the roll bonded cold plate 68 could be arranged to function as the top plate 66 (see, e.g., FIG. 4) or any other plate of the support structure 60.

One end plate 62 may be disposed at each longitudinal extent 70 of the battery array 25, and one side plate 64 may connect between the end plates 62 on each opposing side 72 of the battery array 25. The top plate 66 may connect between the end plates 62 and the side plates 64 and extends over top of the battery cells 56 of the cell stack, and, in the illustrated embodiment, the roll bonded cold plate 68 may connect between the end plates 62 and the side plates 64 and extends beneath the battery cells 56 of the cell stack. The end plates 62 may extend within planes that are transverse to a longitudinal axis A of the battery array 25, and the side plates 64 may extend in planes that are parallel to the longitudinal axis A. In an embodiment, the longitudinal axis A may extend in a cross-car direction when the traction battery pack 24 is mounted on the electrified vehicle 12. However, other mounting configurations and orientations of the battery array 25 relative to the electrified vehicle 12 are further contemplated within the scope of this disclosure.

Figure 5:
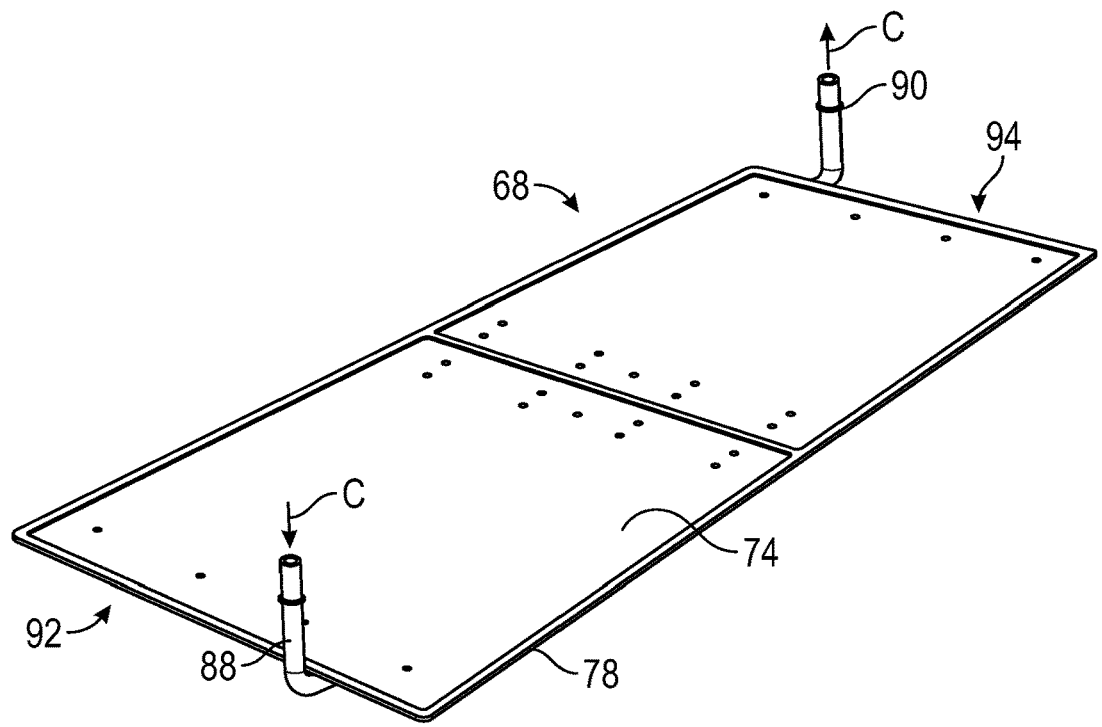
FIG. 5 is a top perspective view of a roll bonded cold plate of the battery array of FIGS. 2-3.
Figure 6:
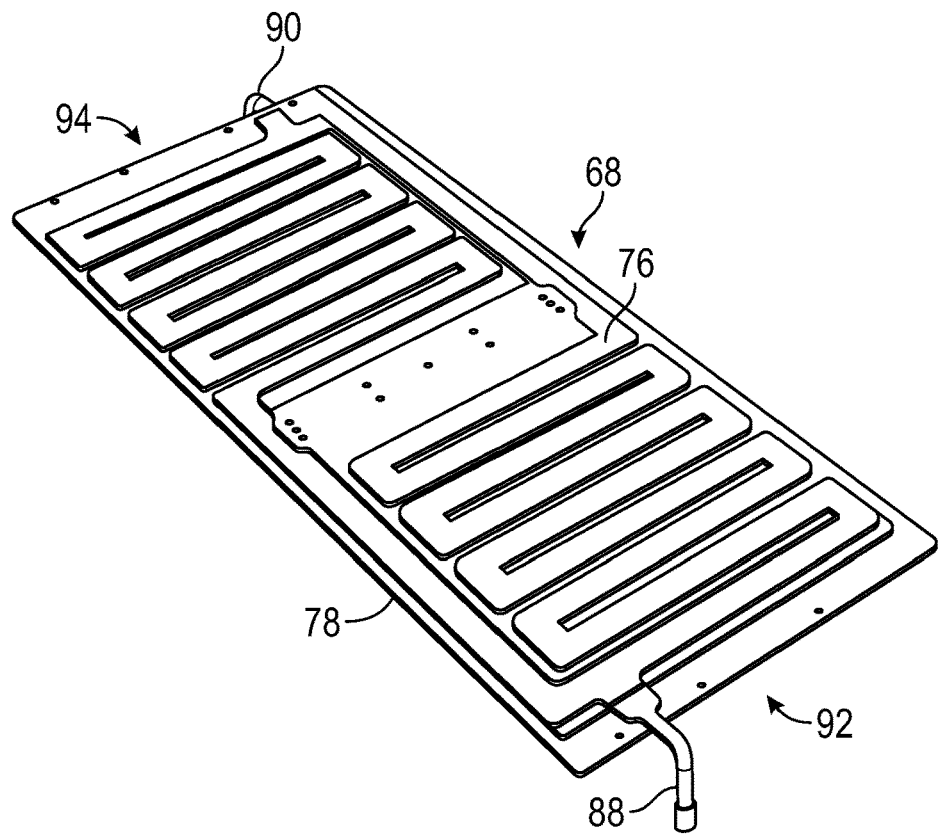
FIG. 6 is a bottom perspective view of the roll bonded cold plate of FIG. 5.

The roll bonded cold plate 68 will now be further described with reference to FIGS. 3 and 5-6. The roll bonded cold plate 68 may include a first plate member 74 and a second plate member 76 that is joined to the first plate member 74 at roll bond joint 78. The first plate member 74 may establish a top side of the roll bonded cold plate 68, and thus in this embodiment is positioned closer to the battery cells 56 of the battery array 25. The second plate member 76 may establish a bottom side of the roll bonded cold plate 68, and thus in this embodiment is positioned further from the battery cells 56. A thermal interface material 80 (e.g., epoxy resin, silicone-based materials, thermal greases, etc.) may be disposed between the battery cells 56 and the first plate member 74 of the roll bonded cold plate 68 for facilitating heat transfer therebetween. (see FIG. 3).

The first plate member 74 may be a thicker plate member than the second plate member 76. Alternatively, the first plate member 74 may be constructed of a material alloy that includes a greater stiffness than the materially alloy construction of the second plate member 76. However, the specific thicknesses and/or material alloy constructions of the first and second plate members 74, 76 are not intended to limit this disclosure.

The roll bonded cold plate 68 may be formed as part of a roll bonding process. For example, a first strip of material for forming the first plate member 74 and a second strip of material for forming the second plate member 76 may be passed through a pair of rollers. The rollers may rotate and apply heat and pressure sufficient enough to bond the first strip of material to the second strip of material along the roll bond joint 78. The bonded strips of material may then be trimmed to a desired size of the roll bonded cold plate 68.

A screen printed pattern may be applied to the first or second strip of material between the two strips prior to feeding them through the rollers. The screen printing pattern ensures that only bare metal surfaces between the first and second strips of material bond to one another.

After creating the roll bond joint 78 via the roll bonding process described above, a high pressure gas or liquid may then be injected near the unbonded surfaces between the first plate member 74 and the second plate member 76 in order to inflate unbonded portions of the second plate member 76. The inflated portions may form a series of cooling passages 82 inside the roll bonded cold plate 68.

Additional sections of the support structure 60 may be secured to the roll bonded cold plate 68. In an embodiment, the side plates 64 and/or the end plates 62 are secured to the roll bonded cold plate 68 by welds 84 (schematically shown in FIG. 3). However, other fastening methodologies may be employed within the scope of this disclosure for securing one or more additional sections of the support structure 60 to the roll bonded cold plate 68.

Each side plate 64 of the support structure 60 may include a mounting flange 86 that protrudes laterally outward from a body of the side plate 64 in a direction away from the opposite side plate 64. The top plate 66 may include a corresponding mounting flanges 87 that may be secured to the mounting flanges 86 for further constructing the support structure 60 about the cell stack.

The cooling passages 82 of the roll bonded cold plate 68 may be part of a liquid cooling system that is configured for circulating a coolant C, such as water mixed with ethylene glycol or any other coolant, through the roll bonded cold plate 68 for thermally managing the battery cells 56. The cooling passages 82 may fluidly connect to another and may be arranged in various patterns inside the roll bonded cold plate 68. In an embodiment, the cooling passages 82 are arranged in a serpentine pattern. However, other patterns could alternatively be utilized. For example, the various cooling passages 82 can be configured in different sizes, shapes, and paths to help meter and balance the flow of the coolant C through the internal cooling circuit of the roll bonded cold plate 68. The size and shape of each cooling passage 82 and the total number of cooling passages 82 are not intended to limit this disclosure and can be specifically tuned to the specific cooling requirements of the traction battery pack 24.

Coolant C may enter the roll bonded cold plate 68 through an inlet port 88 and may exit the roll bonded cold plate 68 through an outlet port 90. In use, the coolant C may be communicated into the inlet port 88 and then through the cooling passages 82 before exiting through the outlet port 90. The coolant C picks up the heat conducted through the first plate member 74 from the battery cells 56 (as facilitated by the thermal interface material 80) as it meanders through the internal cooling circuit established by the cooling passages 82. Although not shown, the coolant C exiting the outlet port 90 may be delivered to a radiator or some other heat exchanging device, be cooled, and then be returned to the inlet port 88 in a closed-loop fashion.

The inlet port 88 and the outlet port 90 may protrude outwardly from exterior surfaces of the roll bonded cold plate 68. In an embodiment, the inlet port 88 extends outwardly from a first side 92 of the roll bonded cold plate 68, and the outlet port 90 extends outwardly from a second, opposing side 94 of the roll bonded cold plate 68 (see FIGS. 5 and 6). However, it should be appreciated that the exact mounting locations for the inlet port 88 and the outlet port 90 are not intended to limit this disclosure.

In the embodiment described above, the roll bonded cold plate 68 establishes a single side of the support structure 60. However, other embodiments are contemplated in which a roll bonded cold plate may be configured to establish multiple sides or sections of the support structure 60 of the battery array 25.

Figure 7:
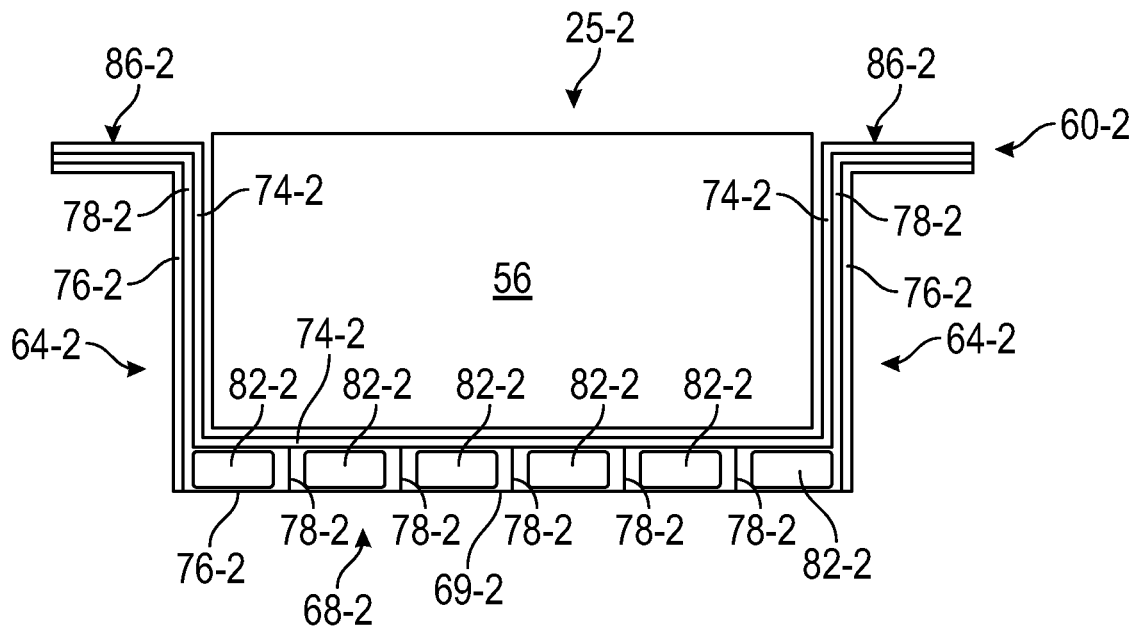
FIG. 7 illustrates select portions of another exemplary battery array.

As shown in FIG. 7, for example, another exemplary battery array 25-2 may include a support structure 60-2 that includes a roll bonded cold plate 68-2. In this embodiment, the roll bonded cold plate 68-2 establishes both a bottom plate 69-2 and side plates 64-2 of the support structure 60-2.

The roll bonded cold plate 68-2 may include a first plate member 74-2 and a second plate member 76-2 that is joined to the first plate member 74-2 at a roll bond joint 78-2. In this embodiment, the portion of the roll bonded cold plate 68-2 establishing the side plates 64-2 (and mounting flanges 86-2) of the support structure 60-2 may include bonded sections of the first plate member 74-2 and the second plate member 76-2. The roll bond joint 78-2 therefore extends within the side plates 64-2, and the side plates 64-2 of this embodiment may exclude any unbonded sections.

Moreover, the portion of the roll bonded cold plate 68-2 establishing the bottom plate 69-2 may include both bonded sections of the first and second plate members 74-2, 76-2 and unbonded sections of the first and second plate members 74-2, 76-2. The unbonded sections may include cooling passages 82-2 for circulating coolant through the roll bonded cold plate 68-2.

Although not shown, the portions of the roll bonded cold plate 68-2 establishing the side plates 64-2 could also be designed to include unbonded sections, and thus, cooling passages could be provided therein. Therefore, the cell stack of battery cells 56 of the battery array 25-2 could optionally be cooled along multiple sides, thereby providing enhanced thermal management capabilities.

Figure 8:
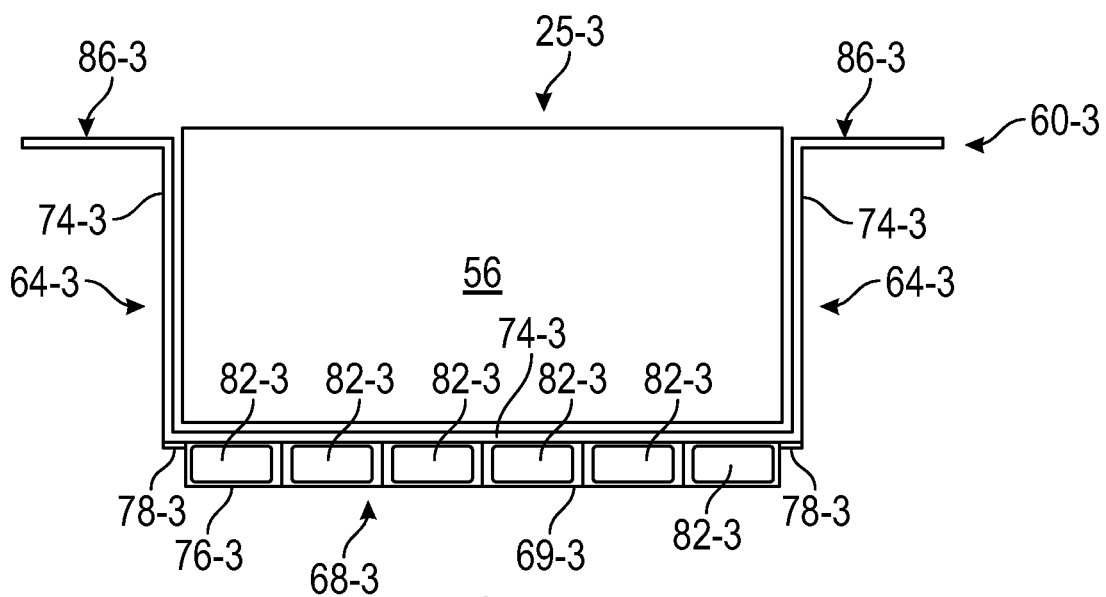
FIG. 8 illustrates select portions of yet another exemplary battery array.

FIG. 8 illustrates another exemplary battery array 25-3. The battery array 25-3 may include a support structure 60-3 that includes a roll bonded cold plate 68-3. In this embodiment, the roll bonded cold plate 68-3 establishes both a bottom plate 69-3 and side plates 64-3 of the support structure 60-3.

The roll bonded cold plate 68-3 may include a first plate member 74-3 and a second plate member 76-3 that is joined to the first plate member 74-3 at a roll bond joint 78-3. In this embodiment, the portion of the roll bonded cold plate 68-3 establishing the side plates 64-3 (and mounting flanges 86-3) of the support structure 60-3 includes only unbonded portions of the first plate member 74-3. Moreover, the portion of the roll bonded cold plate 68-3 establishing the bottom plate 69-3 may include both bonded sections of the first and second plate members 74-3, 76-3 and unbonded sections of the first and second plate members 74-3, 76-3. The unbonded sections of the bottom plate 69-3 may establish cooling passages 82-3 for circulating coolant inside the roll bonded cold plate 68-3.

The exemplary traction battery packs of this disclosure incorporate battery arrays having integrated roll bonded cold plates for achieving various advantageous packaging and cooling configurations. Among other benefits, the proposed designs may reduce the expenses associated with manufacturing cold plates, which have previously been manufactured using relatively expensive stamping and brazing techniques, and improve battery thermal performance.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
   an outer enclosure assembly including an enclosure tray that establishes an outermost surface of the traction battery pack;
   a battery array positioned within the enclosure tray, wherein the battery array includes:
     a grouping of battery cells; and
     a support structure arranged about the grouping of battery cells and including a pair of end plates, a pair of side plates, a top plate, and a bottom plate,
       wherein the bottom plate is established by a roll bonded cold plate that is configured to thermally manage the grouping of battery cells,
       wherein the roll bonded cold plate includes a first plate member and a second plate member that is joined to the first plate member along a roll bond joint,
       wherein the roll bonded cold plate is located between the grouping of battery cells and the enclosure tray.

2. The traction battery pack as recited in claim 1, wherein the roll bonded cold plate includes both roll bonded sections and unbonded sections, wherein a plurality of internal cooling passages are formed in the unbonded sections.

3. The traction battery pack as recited in claim 1, wherein the pair of sides plates are established by one or both of the first plate member and the second plate member of the roll bonded cold plate.

4. The traction battery pack as recited in claim 1, wherein each side plate of the pair of side plates is secured to the roll bonded cold plate by a weld.

5. The traction battery pack as recited in claim 1, wherein the roll bonded cold plate is positioned in direct contact with the grouping of battery cells of the battery array.

6. The traction battery pack as recited in claim 1, wherein the support structure axially constrains the grouping of battery cells in a stacked configuration.

7. The traction battery pack as recited in claim 1, comprising a thermal interface material disposed between the grouping of battery cells and the first plate member.

8. The traction battery pack as recited in claim 1, wherein the first plate member includes a first thickness and the second plate member includes a second thickness that is less than the first thickness.

9. The traction battery pack as recited in claim 1, wherein the first plate member is comprised of a first material alloy and the second plate member is comprised of a second material alloy that is different from the first material alloy.

10. The traction battery pack as recited in claim 1, wherein a side plate of the pair of side plates or an end plate of the pair of end plates of the support structure is secured to the roll bonded cold plate by a weld.

11. A battery array for a traction battery pack, comprising:
a grouping of battery cells; and
a support structure arranged around an outer perimeter of the grouping of battery cells,
wherein the support structure includes a roll bonded cold plate positioned to thermally manage the grouping of battery cells,
wherein the roll bonded cold plate establishes a bottom plate, a first side wall, and a second side wall of the support structure,
wherein the bottom plate includes both roll bonded sections and unbonded sections, and the first side wall and the second side wall each include only roll bonded sections.

12. The traction battery pack as recited in claim 1, wherein the bottom plate includes both roll bonded sections and unbonded sections.

13. The traction battery pack as recited in claim 1, wherein the roll bonded cold plate includes a plurality of internal cooling passages.

14. The traction battery pack as recited in claim 1, wherein the support structure is a separate and distinct structure from the outer enclosure assembly of the traction battery pack.

* * * * *